(12) United States Patent
Kubota (10) Patent No.: US 10,116,148 B2
(45) Date of Patent: Oct. 30, 2018

(54) SECONDARY-BATTERY PROTECTING INTEGRATED CIRCUIT, SECONDARY BATTERY PROTECTION APPARATUS, AND BATTERY PACK

(71) Applicant: Shingo Kubota, Tokyo (JP)

(72) Inventor: Shingo Kubota, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 118 days.

(21) Appl. No.: 15/258,036

(22) Filed: Sep. 7, 2016

(65) Prior Publication Data
US 2017/0098943 A1    Apr. 6, 2017

(30) Foreign Application Priority Data
Oct. 2, 2015 (JP) ................................. 2015-197219

(51) Int. Cl.
*H02J 7/00* (2006.01)
*H01M 10/42* (2006.01)
*H02H 7/18* (2006.01)

(52) U.S. Cl.
CPC ....... *H02J 7/0029* (2013.01); *H01M 10/4257* (2013.01); *H02H 7/18* (2013.01);
(Continued)

(58) Field of Classification Search
CPC .................................................. H02J 7/0029
(Continued)

(56) References Cited

U.S. PATENT DOCUMENTS

| 8,610,405 B2 * | 12/2013 | Yamazaki | H02J 7/0052 320/134 |
| 2010/0141215 A1 * | 6/2010 | Takeda | H01M 10/48 320/136 |

(Continued)

FOREIGN PATENT DOCUMENTS

JP    2012-257407    12/2012

OTHER PUBLICATIONS

Mitsumi Electric Co.,Ltd,"Mitsumi Semiconductor Technical Report," vol. 11, pp. 61-62, 2-2. 2-3, Feb. 2004.

*Primary Examiner* — Samuel Berhanu
*Assistant Examiner* — Tessema Kebede
(74) *Attorney, Agent, or Firm* — IPUSA, PLLC (57) ABSTRACT

A secondary-battery protecting integrated circuit includes, a power supply terminal connected to a positive electrode of the secondary battery, a ground terminal connected to a negative electrode, an input terminal connected to the negative terminal, a control terminal at which a control signal is input, a pull-down resistor connected between the control terminal and the ground terminal, a voltage monitoring circuit monitoring a voltage between the control terminal and the ground terminal, a voltage comparison circuit configured to compare a voltage at the control terminal with a voltage at the input terminal; and a control circuit configured to perform an operation in which a discharge operation of the secondary battery is prevented by turning off a discharge control transistor included in the switch circuit in response to the voltage monitoring circuit detecting that the voltage between the control terminal and the ground terminal is greater than a first threshold.

6 Claims, 5 Drawing Sheets

(52) U.S. Cl.
CPC .......... *H02J 7/0031* (2013.01); *H02J 7/0068* (2013.01); *H02J 7/0081* (2013.01); *H02J 2007/004* (2013.01); *H02J 2007/0037* (2013.01)

(58) Field of Classification Search
USPC ........................................................ 320/134
See application file for complete search history.

(56) References Cited

U.S. PATENT DOCUMENTS

| | | | |
|---|---|---|---|
| 2012/0313574 A1 | 12/2012 | Maetani et al. | |
| 2013/0057221 A1* | 3/2013 | Shibata | H02J 7/0029 320/134 |
| 2013/0202918 A1* | 8/2013 | Kimura | H02J 7/0016 429/7 |
| 2014/0253041 A1* | 9/2014 | Takeda | H01M 10/44 320/134 |
| 2016/0013668 A1* | 1/2016 | Fukuchi | H02J 7/0021 320/134 |
| 2016/0372954 A1* | 12/2016 | Kageyama | H02J 7/0029 |

* cited by examiner

SECONDARY-BATTERY PROTECTING INTEGRATED CIRCUIT, SECONDARY BATTERY PROTECTION APPARATUS, AND BATTERY PACK

CROSS-REFERENCE TO RELATED APPLICATIONS

This patent application is based upon and claims the benefit of priority of Japanese Patent Application No. 2015-197219, filed on Oct. 2, 2015, the entire contents of which are incorporated herein by reference.

BACKGROUND OF THE INVENTION

1. Field of the Invention

The present disclosure relates to secondary-battery protecting integrated circuits, secondary battery protection apparatuses, and battery packs.

2. Description of the Related Art

Conventionally, a circuit for protecting a secondary battery is known, in which the protection operation is performed by turning off a discharge FET (Field-Effect Transistor) disposed between a negative electrode of the secondary battery and a negative terminal connected to ground of a load (e.g., Japanese Unexamined Patent Application Publication No. 2012-257407). In this circuit, a terminal for inputting a control signal is provided. A state of the circuit is transitioned into power down state and the discharge FET is turned off in response to the control signal being input at the terminal, thereby reducing power consumption in the secondary battery.

Figure 1:
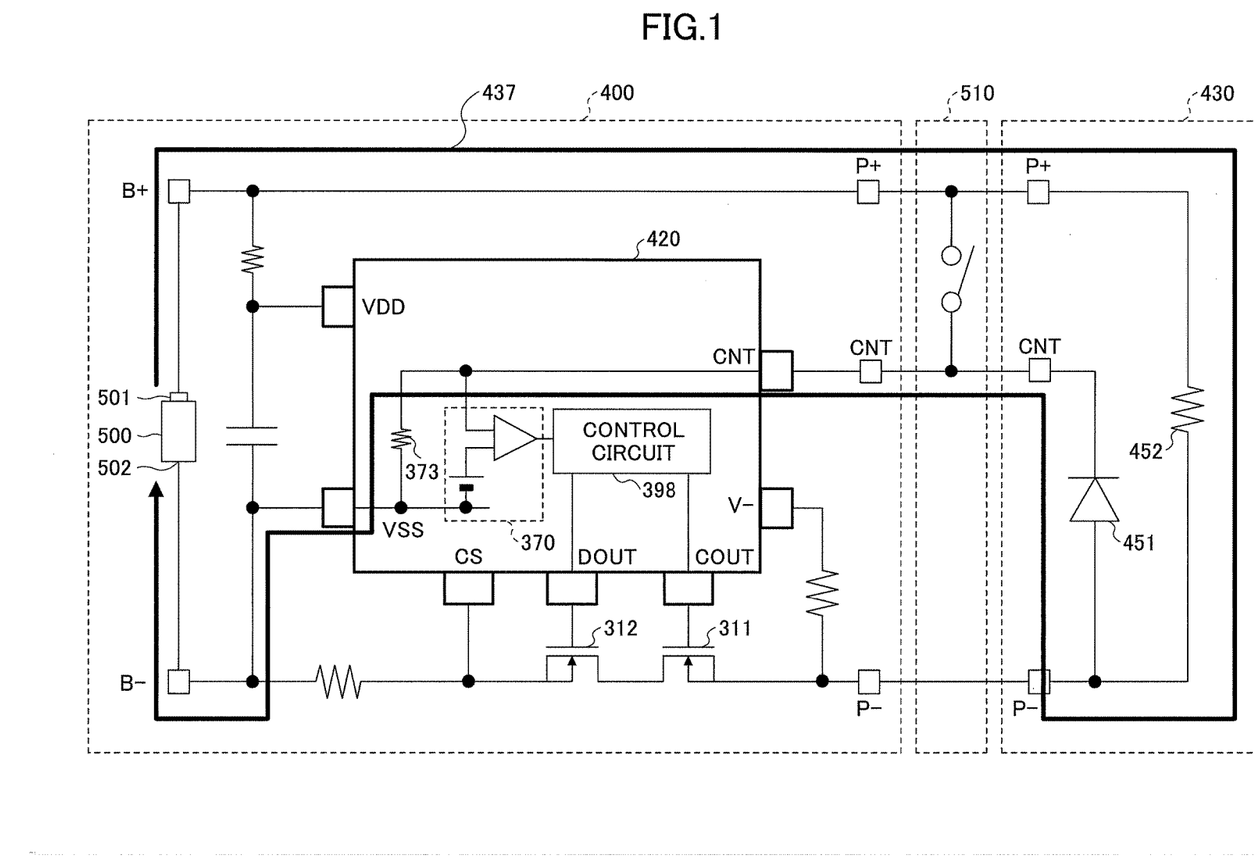
FIG. 1 is a circuit diagram illustrating an example configuration of a secondary-battery protecting integrated circuit including a control terminal at which the control signal is input.

FIG. 1 is a circuit diagram illustrating an example configuration of a secondary-battery protecting integrated circuit 420 including a control terminal CNT at which the control signal is input. The secondary-battery protecting integrated circuit 420 is an example circuit in which a secondary battery 500 is protected by turning off a discharge control transistor 312 to prevent the secondary battery from being in an abnormal state in response to detecting an abnormality, such as over discharge. The discharge control transistor 312 and the charge control transistor 311 are connected in series between a negative electrode 502 of the secondary battery 500 and a negative terminal P− connected to ground of an electronic apparatus 430. Also, the electronic apparatus 430 is an example load having a resistance component 452. The secondary-battery protecting integrated circuit 420, the secondary battery 500, the discharge control transistor 312, and the charge control transistor 311 are integrated in a battery pack 400. The electronic apparatus 430 is connected to and powered by the battery pack 400 via a charge/discharge prevention switch 510.

A control signal, whose voltage varies according to ON state and OFF state of the charge/discharge prevention switch 510, is input at the control terminal CNT. When the charge/discharge prevention switch 510 is turned on, the voltage at the control terminal CNT increases. In response to a detection circuit 370 detecting that the voltage at the control terminal CNT exceeds a predetermined detection threshold of charge/discharge prevention, a control circuit 398 turns off the discharge control transistor 312 and the charge control transistor 311. Thus, charge/discharge operation of the secondary battery 500 is prevented. On the other hand, when the charge/discharge prevention switch 510 is turned off, the voltage at the control terminal CNT decreases. In response to the detection circuit 370 detecting that the voltage at the control terminal CNT is equal to or less than the predetermined detection threshold of recovery from charge/discharge prevention state, the control circuit 398 turns on the discharge control transistor 312 and the charge control transistor 311. Thus, the charge/discharge operation of the secondary battery 500 is allowed to be performed.

However, a pull-down resistor 373 may be disposed between the control terminal CNT and a ground terminal VSS, and a diode 451 may be parasitic or disposed as an electrostatic countermeasure between the control terminal CNT and the negative terminal P−. In this case, even if the discharge operation of the secondary battery 500 is prevented by turning off the discharge control transistor 312 (in discharge prevention state), a discharge current 437 from the secondary battery 500 may flow through a positive electrode 501, the resistance component 452, the diode 451, the control terminal CNT, the pull-down resistor 373, the ground terminal VSS, and the negative electrode 502.

When a resistance value of the pull-down resistor 373 is increased, increase of the discharge current 437 can be suppressed in the discharge prevention state. However, if the resistance value of the pull-down resistor 373 is increased (raised), the voltage at the control terminal CNT increases due to the discharge current 437. Therefore, recovery from the discharge prevention state may be unable to be performed even when the charge/discharge prevention switch 510 is turned off. That is, the detection circuit 370 cannot detect that the voltage at the control terminal CNT is equal to or less than the predetermined threshold due to the increased voltage at the control terminal CNT. Accordingly, the control circuit 398 may not turn the state of the discharge control transistor 312 and the charge control transistor 311 from OFF to ON.

RELATED ART DOCUMENT

Patent Document

[Patent Document 1]: Japanese Laid-open Patent Publication No. 2012-257407

SUMMARY OF THE INVENTION

An object of the present disclosure is to enable the recovery from the discharge prevention state even when a diode is exists between the control terminal and the negative terminal.

According to one embodiment of the present invention, there is provided a secondary-battery protecting integrated circuit for protecting a secondary battery by controlling a switch circuit connected in series in a charge/discharge current path between a negative electrode of the secondary battery and a negative terminal connected to a ground of a load, the secondary-battery protecting integrated circuit including, a power supply terminal connected to a positive electrode of the secondary battery, a ground terminal connected to a negative electrode of the secondary battery, an input terminal connected to the negative terminal, a control terminal at which a control signal is input, a pull-down resistor connected between the control terminal and the ground terminal, a voltage monitoring circuit configured to monitor a voltage between the control terminal and the ground terminal, a voltage comparison circuit configured to compare a voltage at the control terminal with a voltage at the input terminal; and a control circuit configured to perform an operation in which a discharge operation of the secondary battery is prevented by turning off a discharge control transistor included in the switch circuit in response to the voltage monitoring circuit detecting that the voltage between the control terminal and the ground terminal is greater than a first threshold, wherein the discharge operation of the secondary battery is allowed to be performed by turning on the discharge control transistor in response to the voltage comparison circuit detecting that the voltage at the control terminal is lower than the voltage at the input terminal.

Additional objects and advantages of the embodiments are set forth in part in the description which follows, and in part will become apparent from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory and are not restrictive of the invention as claimed.

DETAILED DESCRIPTION OF THE PREFERRED EMBODIMENTS

In the following, embodiments of the present disclosure will be described with reference to accompanying drawings.

Figure 2:
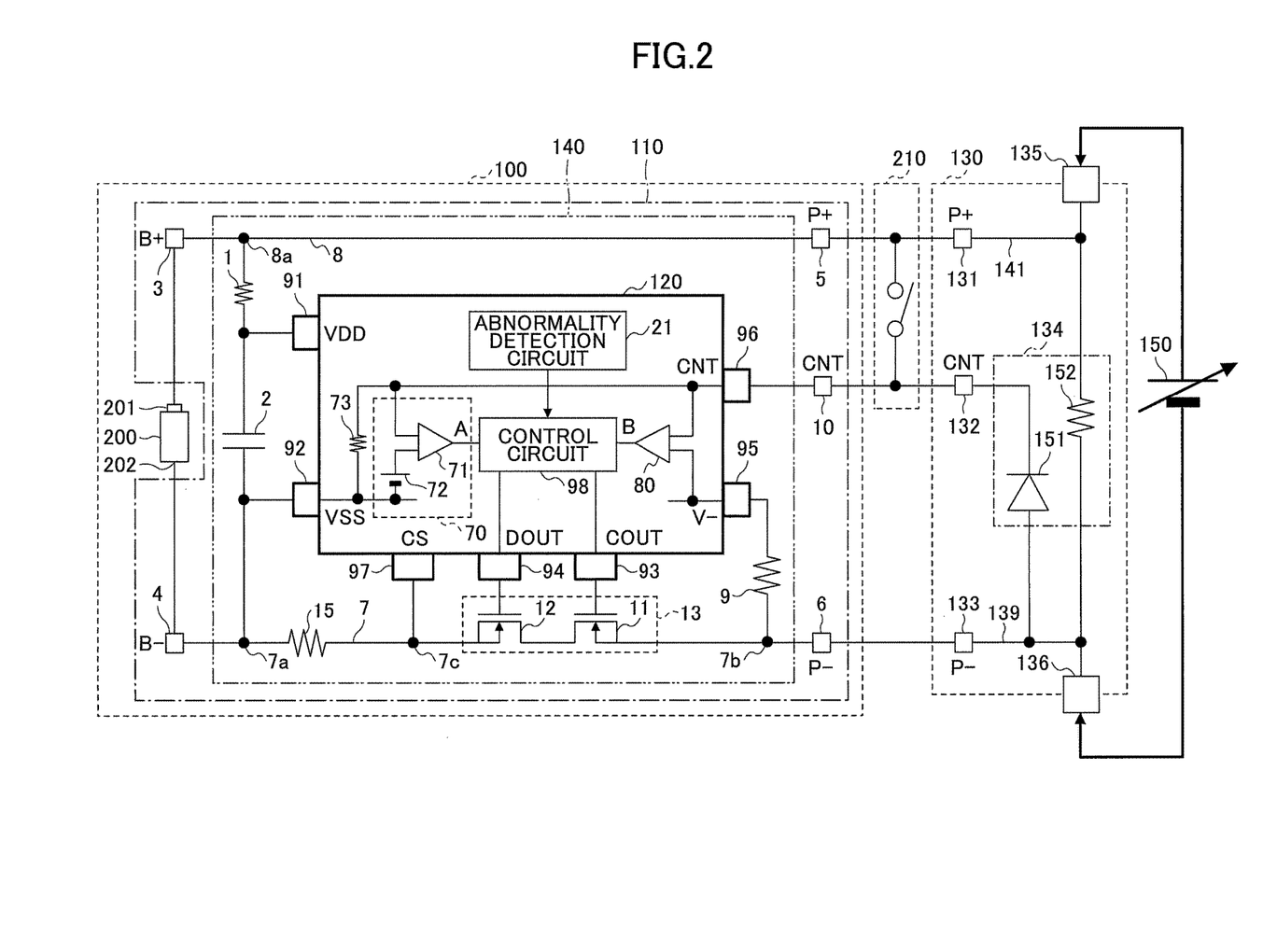
FIG. 2 is a diagram illustrating an example configuration of a battery pack and an electronic apparatus.

FIG. 2 is a diagram illustrating an example configuration of battery pack 100 and an electronic apparatus 130. The battery pack 100 includes a secondary battery 200 that powers the electronic apparatus 130 and a secondary battery protection apparatus 110 for protecting the secondary battery 200, where the electronic apparatus 130 is connected to the battery pack 100 through a positive terminal 5 and a negative terminal 6. The battery pack 100 may be included in the electronic apparatus 130, or may be provided externally. The battery pack 100 supplies the electric power of the secondary battery 200 to the electronic apparatus 130, where the electronic apparatus 130 is connected to the battery pack 100 via a charge/discharge prevention switch 210.

The electronic apparatus 130 is an example load powered by the secondary battery 200 of the battery pack 100. A non-limiting example of the electronic apparatus 130 is a mobile terminal apparatus. A mobile phone, a smartphone, a tablet computer, a game machine, a television apparatus, a music/movie player, and a camera can be exemplified as the mobile terminal apparatus.

A lithium ion battery and a lithium polymer battery can be exemplified as the secondary battery 200.

The secondary battery protection apparatus 110 is an example apparatus, which is powered by the secondary battery 200, for protecting the secondary battery 200 from being over discharged, etc., by controlling charge/discharge operation of the secondary battery 200. The secondary battery protection apparatus 110 includes a charge/discharge control circuit 140, a battery positive electrode connection terminal 3, a battery negative electrode connection terminal 4, the positive terminal 5, the negative terminal 6, and a control input terminal 10.

The charge/discharge control circuit 140 is an example circuit for protecting the secondary battery 200 from being over discharged, etc., by controlling charge/discharge operation of the secondary battery 200. The charge/discharge control circuit 140 includes a switch circuit 13, a secondary-battery protecting integrated circuit 120, a resistor 1, a capacitor 2, a resistor 9, and a sense resistor 15.

The battery positive electrode connection terminal 3 is a terminal connected to a positive electrode 201 of the secondary battery 200. The battery negative electrode connection terminal 4 is a terminal connected to a negative electrode 202 of the secondary battery 200. The positive terminal 5 is an example terminal connected to an apparatus positive terminal 131 of the electronic apparatus 130, where the positive terminal 5 is connected to an apparatus power supply path 141 of the electronic apparatus 130 via the apparatus positive terminal 131. The negative terminal 6 is an example terminal connected to an apparatus negative terminal 133 of the electronic apparatus 130, where the negative terminal 6 is connected to an apparatus ground 139 of the electronic apparatus 130 via the apparatus negative terminal 133. The control input terminal 10 is an example terminal connected to a control output terminal 132 of the electronic apparatus 130, where the control input terminal 10 is connected to a control unit 134 of the electronic apparatus 130 via the control output terminal 132.

The electronic apparatus 130 is an example load having a resistance component 152. The electronic apparatus 130 includes a control unit 134 having a diode 151 and a resistance component 152. The diode 151 is an element that is parasitic or disposed as an electrostatic countermeasure between the control output terminal 132 and the apparatus negative terminal 133. An anode of the diode 151 is connected to the apparatus negative terminal 133, and connected to the negative terminal 6 and an input terminal 95 via the apparatus negative terminal 133. A cathode of the diode 151 is connected to the control output terminal 132, and connected to a control terminal 96 via the control output terminal 132.

The battery positive electrode connection terminal 3 and the positive terminal 5 are connected through a positive side power supply path 8, while the battery negative electrode connection terminal 4 and the negative terminal 6 are connected through a negative side power supply path 7. The positive side power supply path 8 is an example charge/discharge current path between the battery positive electrode connection terminal 3 and the positive terminal 5. The negative side power supply path 7 is an example charge/discharge current path between the battery negative electrode connection terminal 4 and the negative terminal 6.

The secondary battery protection apparatus 110 includes the switch circuit 13. The switch circuit 13 is connected in series in the negative side power supply path 7 that is disposed between a first negative side connection point 7a and a second negative side connection point 7b. For example, a charge control transistor 11 and a discharge control transistor 12 that are connected in series are included in the switch circuit 13. In response to turning off the charge control transistor 11, the negative side power supply path 7 through which charge current of the secondary battery 200 flows is shut off, thereby preventing charge current flow in the secondary battery 200. In response to turning off the discharge control transistor 12, the negative side power supply path 7 through which discharge current of the secondary battery 200 flows is shut off, thereby preventing discharge current flow in the secondary battery 200.

For example, the charge control transistor 11 and the discharge control transistor 12 are respectively MOSFETs (Metal Oxide Semiconductor Field Effect Transistor). The charge control transistor 11 is disposed in the negative side power supply path 7, where a forward direction of a parasitic diode in the charge control transistor 11 coincides with a discharge direction of the secondary battery 200. The discharge control transistor 12 is disposed in the negative side power supply path 7, where a forward direction of a parasitic diode in the discharge control transistor 12 coincides with a charge direction of the secondary battery 200.

The secondary battery protection apparatus 110 includes the secondary-battery protecting integrated circuit 120. The secondary-battery protecting integrated circuit 120, which is powered by the secondary battery 200, is an example integrated circuit for protecting the secondary battery 200 from overcurrent, etc., by controlling charge/discharge operation of the secondary battery 200. The secondary-battery protecting integrated circuit 120 protects the secondary battery 200 while the secondary-battery protecting integrated circuit 120 is powered by the secondary battery 200.

For example, the secondary-battery protecting integrated circuit 120 includes a power supply terminal 91, a ground terminal 92, a charge control terminal 93, a discharge control terminal 94, the input terminal 95, the control terminal 96, and a current detection terminal 97.

The power supply terminal 91 is a positive side power supply terminal coupled to a positive electrode 201 of the secondary battery 200 via a positive side connection point 8a and the battery positive electrode connection terminal 3, and may be referred to as a VDD terminal. For example, the power supply terminal 91 is connected with a connection point at which one end of the resistor 1 and one end of a capacitor 2 is connected, where the other end of the resistor 1 is connected to the positive side power supply path 8, and the other end of the capacitor 2 is connected to the negative side power supply path 7. The other end of the capacitor 2 is connected with the negative side power supply path 7 at a first negative side connection point 7a, where the negative side power supply path 7 is disposed between the negative electrode connection terminal 4 and the discharge control transistor 12.

The ground terminal 92 is a negative side power supply terminal coupled to a negative electrode 202 of the secondary battery 200 via the first negative side connection point 7a and the battery negative electrode connection terminal 4, and may be referred to as a VSS terminal. The ground terminal 92 is connected with the negative side power supply path 7 at the first negative side connection point 7a, and coupled to a source of the discharge control transistor 12.

The charge control terminal 93 is a terminal from which a signal for preventing the charge operation of the secondary battery 200 is output, and the charge control terminal 93 may be referred to as COUT terminal. The charge control output terminal 93 is coupled to a control electrode (e.g., gate in MOSFET) of the charge control transistor 11.

The discharge control terminal 94 is a terminal from which a signal for preventing discharge operation of the secondary battery 200 is output, and the discharge control terminal 94 may be referred to as a DOUT terminal. The discharge control terminal 94 is coupled to a control electrode (e.g., gate in MOSFET) of the discharge control transistor 12.

The input terminal 95 is coupled to the negative terminal 6 that is coupled to an apparatus ground 139 of the electronic apparatus 130, and may be referred to as a V− terminal. The input terminal 95 is connected with the negative side power supply path 7 at a second negative side connection point 7b via a resistor 9, where the negative side power supply path 7 is formed between the negative terminal 6 and the charge control transistor 11. The input terminal 95 is coupled to a source of the charge control transistor 11 via the resistor 9.

The control terminal 96 is a terminal at which a control signal, whose reference voltage is that of the negative terminal 6, is input via a control input terminal 10, and the control terminal 96 may be referred to as a CNT terminal. The control input terminal 10 is connected to a control output terminal 132.

The current detection terminal 97 is an example terminal provided for the secondary-battery protecting integrated circuit 120. The current detection terminal 97 is connected with the negative side power supply path 7 at a third negative side connection point 7c opposite the first negative side connection point 7a with a sense resistor 15 disposed therebetween, and may be referred to as a CS terminal. The sense resistor 15 is a current detection resistor connected in series with the negative side power supply path 7. One end of the sense resistor 15 is connected to the negative electrode 202 of the secondary battery 200 and the ground terminal 92 via the first negative side connection point 7a, while the other end of the sense resistor 15 is connected to the source of the discharge control transistor 12 and the current detection terminal 97 via the third negative side connection point 7c.

The secondary-battery protecting integrated circuit 120 performs a protection operation of the secondary battery 200. The secondary-battery protecting integrated circuit 120 includes an abnormality detection circuit 21 and a control circuit 98. The abnormality detection circuit 21 is an example detection unit for detecting abnormal current or abnormal voltage of the secondary battery 200. The control circuit 98 includes a switch control circuit for controlling on/off of the transistors 11 and 12 in the switch circuit 13 based on the abnormality detection result of the abnormality detection circuit 21. For example, the control circuit 98 and the switch control circuit are formed by logic circuits.

For example, the control circuit 98 performs an operation to protect the secondary battery 200 from being overcharged (overcharge protection operation). For example, the abnormality detection circuit 21 detects a voltage between the power supply terminal 91 and the ground terminal 92, thereby monitoring a battery voltage (cell voltage) of the secondary battery 200. The abnormality detection circuit 21 detects a cell voltage greater than or equal to a predetermined overcharge detection voltage Vdet1 to detect the overcharge of the secondary battery 200, and outputs an overcharge detection signal upon detecting the cell voltage greater than or equal to the overcharge detection voltage Vdet1.

In response to detecting the overcharge detection signal, the control circuit 98 waits until a predetermined overcharge detection delay time tVdet1 passes, then performs the overcharge protection operation in which a control signal at a low level for turning off the charge control transistor 11 is output from the charge control terminal 93. When the charge control transistor 11 is turned off, charging of the secondary battery 200 is prevented, regardless of the on/off state of the discharge control transistor 12, thereby preventing the overcharge of the secondary battery 200.

For example, the control circuit 98 performs an operation for protecting the secondary battery 200 from being over discharged (over discharge protection operation). For example, the abnormality detection circuit 21 detects a voltage between the power supply terminal 91 and the ground terminal 92, thereby monitoring a battery voltage (cell voltage) of the secondary battery 200. The abnormality detection circuit 21 detects a cell voltage equal to or less than a predetermined over discharge detection voltage Vdet2 to detect the over discharge of the secondary battery 200, and outputs an over discharge detection signal upon detecting the cell voltage equal to or less than the overcharge detection voltage Vdet2.

In response to detecting the over discharge detection signal, the control circuit 98 waits until a predetermined over discharge detection delay time tVdet2 passes, then performs the over discharge protection operation in which a charge control signal at a low level for turning off the discharge control transistor 12 is output from the discharge control terminal 94. When the discharge control transistor 12 is turned off, discharge of the secondary battery 200 is prevented regardless of on/off state of the charge control transistor 11, thereby preventing the over discharge of the secondary battery 200.

On the other hand, the abnormality detection circuit 21 detects a cell voltage greater than or equal to a predetermined over discharge detection recovery voltage Vrel2 to determine that the secondary battery 200 has recovered from an over discharge state to a normal state, and outputs an over discharge recovery signal upon detecting the cell voltage greater than or equal to the over discharge detection recovery voltage Vrel2. The over discharge detection recovery voltage Vrel2 is greater than the over discharge detection voltage Vdet2.

In response to detecting the over discharge recovery signal (or in response to detecting that the over discharge detection signal is stopped to be output), the control circuit 98 outputs a control signal at a high level for turning on the discharge control transistor 12 from the discharge control terminal 94. Upon the discharge control transistor 12 being tuned on, the over discharge protection operation is finished.

For example, the control circuit 98 performs an operation (discharge overcurrent protection operation) for protecting the secondary battery 200 from discharge overcurrent. For example, the abnormality detection circuit 21 detects a sense voltage between the current detection terminal 97 and the ground terminal 92 caused by current flowing through the sense resistor 15. By detecting the sense voltage greater than or equal to a predetermined discharge overcurrent detection voltage Vdet3, the abnormality detection circuit 21 outputs an discharge overcurrent detection signal indicating that discharge overcurrent is detected, where the discharge overcurrent is abnormal current flowing through the negative side power supply path 7 in a discharge direction of the secondary battery 200.

In response to detecting the discharge overcurrent detection signal, the control circuit 98 waits until a predetermined discharge overcurrent detection delay time tVdet3 has elapsed, then the control circuit 98 performs the discharge overcurrent protection operation in which a control signal at the low level for turning off the discharge control transistor 12 is output form the discharge control terminal 94. When the discharge control transistor 12 is turned off, discharge of the secondary battery 200 is prevented regardless of on/off state of the charge control transistor 11, thereby preventing the overcurrent flowing in the discharge direction of the secondary battery 200.

For example, the control circuit 98 performs an operation (charge overcurrent protection operation) for protecting the secondary battery 200 from charge overcurrent. For example, the abnormality detection circuit 21 detects a sense voltage between the current detection terminal 97 and the ground terminal 92 caused by current flowing through the sense resistor 15. In response to detecting the sense voltage equal to or less than a predetermined charge overcurrent detection voltage Vdet4, the abnormality detection circuit 21 outputs a charge overcurrent detection signal indicating that the charge overcurrent is detected, where the charge overcurrent is abnormal current flowing through the negative side power supply path 7 in a charge direction of the secondary battery 200.

In response to detecting the charge overcurrent detection signal, the control circuit 98 waits until a predetermined charge overcurrent detection delay time tVdet4 passes, then the control circuit 98 performs the charge overcurrent protection operation in which a control signal at the low level for turning off the charge control transistor 11 is output form the charge control terminal 93. When the charge control transistor 11 is turned off, charging of the secondary battery 200 is prevented regardless of on/off state of the discharge control transistor 12, thereby preventing the overcurrent flowing in the charge direction of the secondary battery 200.

For example, the control circuit 98 performs an operation (short-circuiting protecting operation) for protecting the secondary battery 200 from short-circuiting current by controlling the discharge control transistor 12. For example, in response to detecting the voltage between the current detection terminal 97 and the ground terminal 92 greater than or equal to a predetermined first short circuiting detection voltage Vshort1, the abnormality detection circuit 21 outputs a short-circuiting detection signal indicating that a short-circuiting abnormality (short-circuiting overcurrent) between the positive terminal 5 and the negative terminal 6 is detected. Or, for example, in response to detecting the voltage between the input terminal 95 and the ground terminal 92 greater than or equal to a predetermined second short circuiting detection voltage Vshort2, the abnormality detection circuit 21 outputs the short-circuiting detection signal indicating that a short-circuiting abnormality (short-circuiting overcurrent) between the positive terminal 5 and the negative terminal 6 is detected. The second short circuiting detection voltage Vshort2 is sufficiently greater than the first short circuiting detection voltage Vshort1.

In response to detecting the short-circuiting detection signal, the control circuit 98 performs the short-circuiting protection operation in which the control signal at the low level for turning off the discharge control transistor 12 is output from the discharge control terminal 94. When the discharge control transistor 12 is turned off, discharge of the secondary battery 200 is prevented regardless of on/off state of the charge control transistor 11, thereby preventing the short-circuiting current flowing in the discharge direction of the secondary battery 200.

The secondary-battery protecting integrated circuit 120 includes a pull-down resistor 73, a voltage monitoring circuit 70, and a voltage comparison circuit 80. The pull-down resistor 73 is connected between the control terminal 96 and the ground terminal 92. The voltage monitoring circuit 70 monitors a voltage between the control terminal 96 and the ground terminal 92. For example, the voltage monitoring circuit 70 includes a threshold voltage generation circuit for generating a threshold voltage 72 and a comparator 71. The voltage comparison circuit 80 includes a comparator for comparing a voltage at the control terminal 96 with a voltage at the input terminal 95.

A control signal whose voltage varies according to on/off state of the charge/discharge prevention switch 210 is input at the control terminal 96. When the charge/discharge prevention switch 210 is turned on, the voltage between the control terminal 96 and the ground terminal 92 increases. When the comparator 71 of the voltage monitoring circuit 70 detects the voltage between the control terminal 96 and the ground terminal 92 exceeding the detection threshold of charge/discharge prevention (example of a predetermined first threshold), the control circuit 98 turns off the discharge control transistor 12 and the charge control transistor 11. Thus, charge/discharge operation of the secondary battery 200 is prevented. On the other hand, upon the charge/discharge prevention switch 210 being turned off, the voltage between the control terminal 96 and the ground terminal 92 decreases. In response to the comparator 71 of the voltage monitoring circuit 70 detecting the voltage between the control terminal 96 and the ground terminal 92 equal to or less than a predetermined detection threshold of recovery from charge/discharge prevention state (example of a predetermined second threshold equal to or less than first threshold), the control circuit 98 turns on the discharge control transistor 12 and the charge control transistor 11. Thus, the he charge/discharge operation of the secondary battery 200 is allowed to be performed.

The diode 151 of the electronic apparatus 130 is an element that is parasitic or disposed as an electrostatic countermeasure between the control output terminal 132 and the apparatus negative terminal 133. An anode of the diode 151 is connected to the apparatus negative terminal 133, and connected to the negative terminal 6 and an input terminal 95 via the apparatus negative terminal 133. A cathode of the diode 151 is connected to the control output terminal 132, and connected to a control terminal 96 via the control output terminal 132.

If the diode 151 is not disposed between the control terminal 96 and the negative terminal 6, the control terminal 96 is pulled-down to the ground terminal 92 through the pull-down resistor 73. Therefore, the control circuit 98 can recover from the charge/discharge prevention state. That is, the comparator 71 of the voltage monitoring circuit 70 detects that the voltage between the control terminal 96 and the ground terminal 92 is equal to or less than the predetermined detection threshold of recovery from the charge/discharge prevention state. Therefore, the control circuit 98 can turn on the discharge control transistor 12 and the charge control transistor 11.

Figure 3:
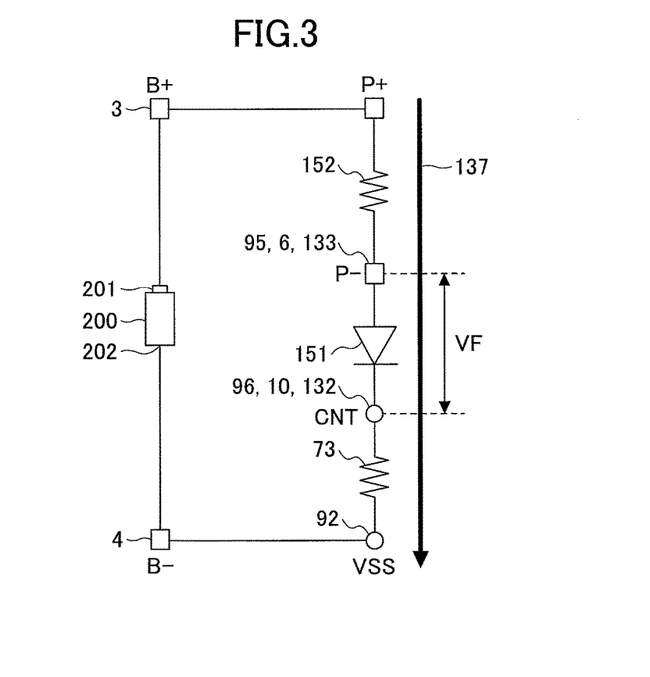
FIG. 3 is an equivalent circuit diagram in a case where a charge/discharge prevention switch, a discharge control transistor, and a charge control transistor are turned off and a diode is disposed.

On the other hand, in a case where the diode 151 is disposed between the control terminal 96 and the negative terminal 6, the discharge current 137 from the secondary battery 200 flows as illustrated in FIG. 3 when the discharge control transistor 12 and the charge control transistor 11 are turned off.

FIG. 3 is an equivalent circuit diagram in a case where the charge/discharge prevention switch 210, discharge control transistor 12, and the charge control transistor 11 are turned off and the diode 151 is disposed. The voltage at the control terminal 96 is defined according to the discharge current 137 from the secondary battery 200, the resistor 152, and the pull-down resistor 73. Therefore, in a case where a resistance value of the pull-down resistor 73 is relatively high, the voltage between the control terminal 96 and the ground terminal 92 is excessively increased (raised) due to the discharge current 137. Therefore, even when the charge/discharge prevention switch 210 is turned off, the voltage monitoring circuit 70 may be unable to detect that the voltage between the control terminal 96 and the ground terminal 92 is equal to or less than the detection threshold of recovery from the charge/discharge prevention. Accordingly, a recovery operation from the charge/discharge prevention may not be performed. However, when the discharge current 137 flows, the voltage at the control terminal 96 falls below the voltage at the input terminal 95 or negative terminal 6 by a forward voltage of the diode 151.

Therefore, in response to the voltage comparison circuit 80 detecting that the voltage at the control terminal 96 is lower than the voltage at the input terminal 95, the control circuit 98 allows the charge/discharge operation of the secondary battery 200 by turning on the discharge control transistor 12 and the charge control transistor 11. Thus, the recovery operation from the charge/discharge prevention can be performed.

Figure 4:
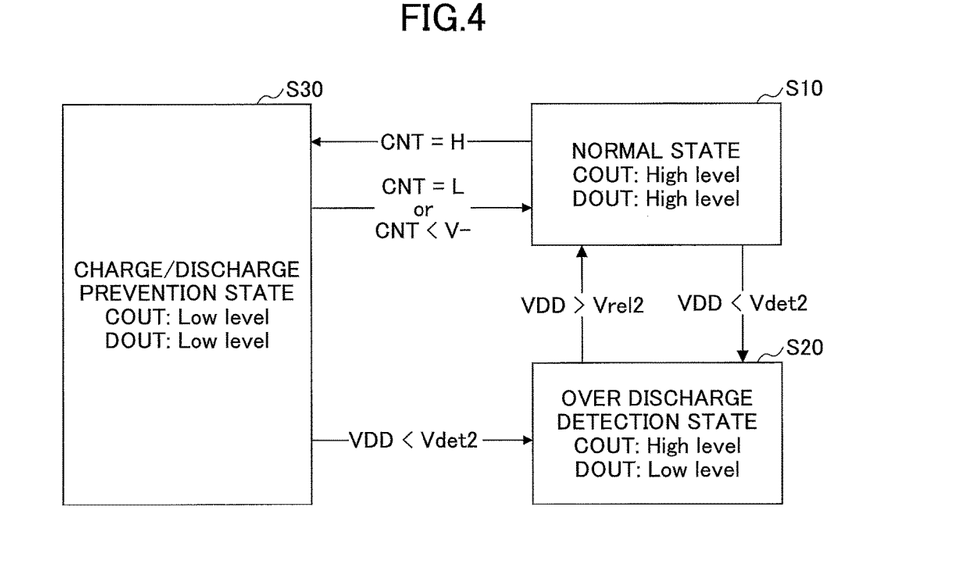
FIG. 4 is a state transition diagram of control circuit.

FIG. 4 is a state transition diagram of the control circuit 98.

In a normal state S10, the control circuit 98 causes voltage levels of the COUT terminal and the DOUT terminal to be high level, thereby turning on the discharge control transistor 12 and the charge control transistor 11. In the normal state S10, the control circuit 98 causes a voltage level of the COUT terminal to be high level and the a voltage level of DOUT terminal to be low level in response to the abnormality detection circuit 21 detecting a cell voltage less than the predetermined over discharge detection voltage Vdet2. Thus, an operation state of the control circuit 98 is transitioned into an over discharge detection state S20 in which the discharge control transistor 12 is turned off. In the over discharge detection state S20, the control circuit 98 causes a voltage level of the COUT terminal to be high level and the a voltage level of DOUT terminal to be high level in response to the abnormality detection circuit 21 detecting a cell voltage greater than the predetermined over discharge detection recovery voltage Vrel2. Thus, the operation state of the control circuit 98 is transitioned into the normal state S10.

In the normal state S10, the control circuit 98 causes voltage levels of the COUT terminal and the DOUT terminal to be low level by turning off the discharge control transistor 12 and the charge control transistor 11 in response to the voltage monitoring circuit 70 detecting a voltage at the control terminal 96 greater than the detection threshold of the charge/discharge prevention state (CNT=H). Thus, the operation state of the control circuit 98 is transitioned into a charge/discharge prevention state S30.

In the charge/discharge prevention state S30, the control circuit 98 causes voltage levels of the COUT terminal and the DOUT terminal to be high level in response to the voltage monitoring circuit 70 detecting that the voltage between the control terminal 96 and the ground terminal 92 is equal to or less than the detection threshold of recovery from the charge/discharge prevention state (CNT=L), or in response to the voltage comparison circuit 80 detecting that the voltage at the control terminal 96 is lower than the voltage at the input terminal 95 (CNT<V−). Thus, the discharge control transistor 12 and the charge control transistor 11 are turned on, and the operation state of the control circuit 98 is transitioned into the normal state S10.

In the charge/discharge prevention state S30, the control circuit 98 causes a voltage level of the COUT terminal to be high level and the a voltage level of DOUT terminal to be low level in response to the abnormality detection circuit 21 detecting a cell voltage less than the predetermined over discharge detection voltage Vdet2. Thus, the operation state of the control circuit 98 is transitioned into the over discharge detection state S20.

Therefore, according to the present embodiment, the charge/discharge operation of the secondary battery 200 can be controlled to be allowed or prevented by turning on/off the charge/discharge prevention switch 210 regardless of whether the diode 151 is present in the electronic apparatus 130. Also, the recovery operation from the charge/discharge prevention state can be performed without changing configuration of the electronic apparatus 130. Hence current consumption in the battery pack 100 can be reduced.

Figure 5:
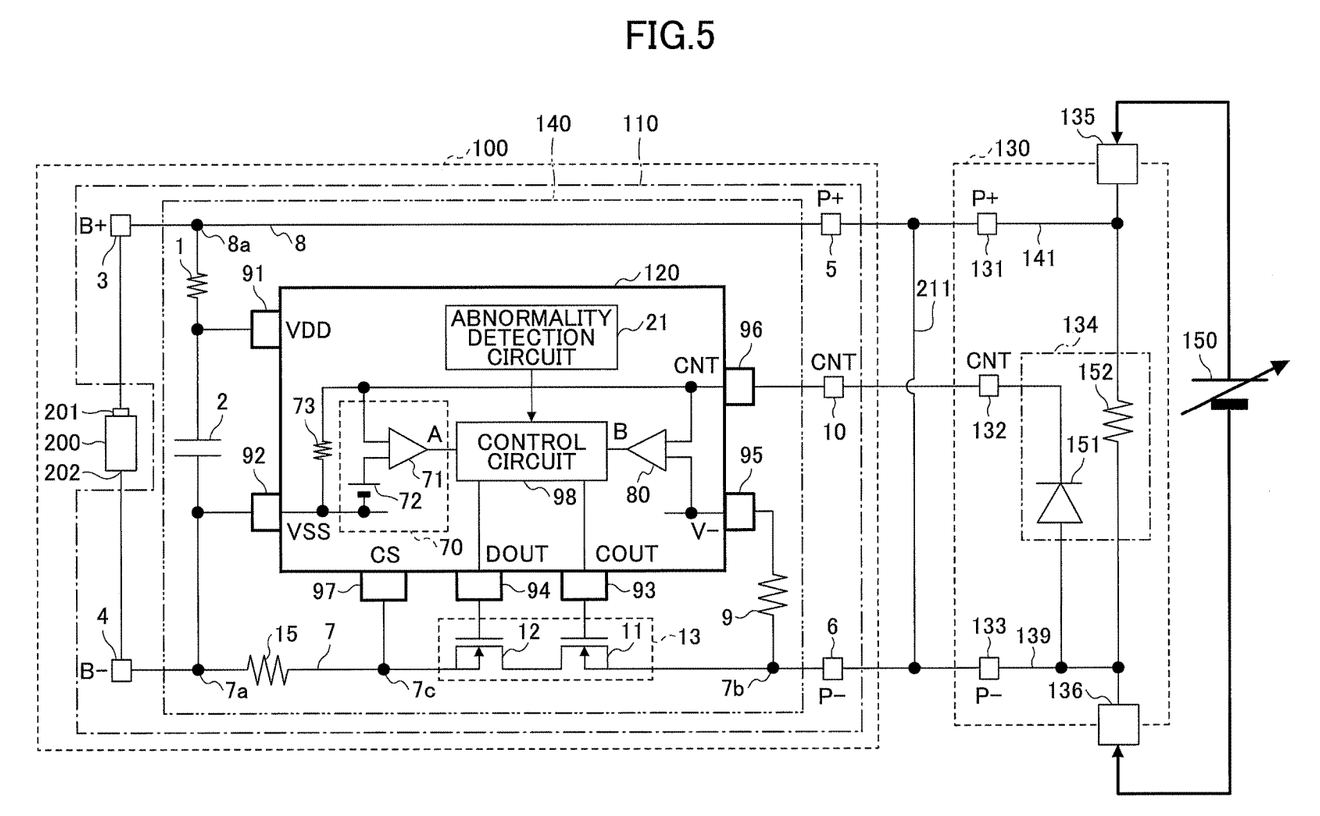
FIG. 5 is a circuit diagram illustrating another example configuration of the battery pack and the electronic apparatus.

Also, as illustrated in FIG. 5, in response to detecting a short-circuiting abnormality 211 between the positive terminal 5 and the negative terminal 6, the control circuit 98 turns off the discharge control transistor 12 (discharge prevention state) as described above. In the discharge prevention state due to the short-circuiting abnormality 211, the voltage between the control terminal 96 and the ground terminal 92 also increases (is raised) in a case where the diode 151 is present. Therefore, the voltage monitoring circuit 70 may detect that the voltage between the control terminal 96 and the ground terminal 92 exceeds the detection threshold of charge/discharge prevention, thereby causing false detection of charge/discharge prevention state.

Figure 6:
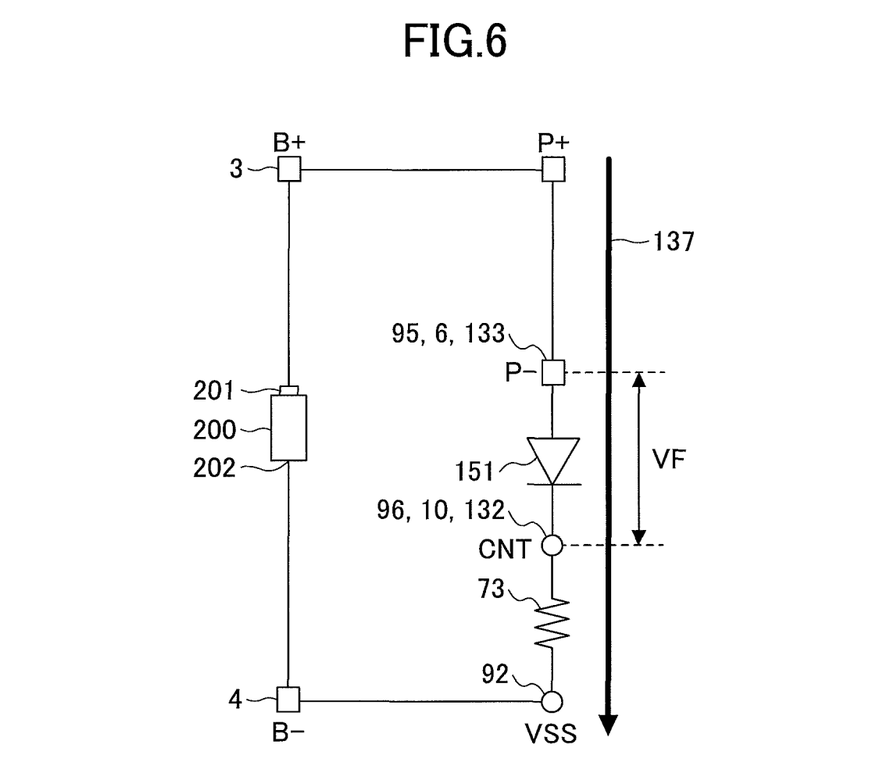
FIG. 6 is an equivalent circuit diagram in a case where short circuiting is detected, and a diode is disposed.

However, in the discharge prevention state due to the short-circuiting abnormality 211, the voltage at the control terminal 96 falls below the voltage at the input terminal 95 by a forward voltage of the diode 151 (see FIG. 6). According to a diode detecting function of the voltage comparison circuit 80, the decrease of the voltage at the control terminal 96 can be detected. Therefore, false detection of charge/discharge prevention state can be avoided.

Herein above, although the secondary-battery protecting integrated circuit has been described with respect to specific embodiments, the appended claims are not to be thus limited. It should be understood that the various changes, substitutions, and modifications could be made hereto without departing from the spirit and scope of the claims. Further, all or part of the components of the embodiments described above can be combined.

What is claimed is:

1. A secondary-battery protecting integrated circuit for protecting a secondary battery by controlling a switch circuit connected in series in a charge/discharge current path between a negative electrode of the secondary battery and a negative terminal connected to a lower voltage side power supply node of a load, the secondary-battery protecting integrated circuit comprising:
   a power supply terminal connected to a positive electrode of the secondary battery;
   a ground terminal connected to a negative electrode of the secondary battery;
   an input terminal connected to the negative terminal;
   a control terminal at which a control signal is input;
   a pull-down resistor connected between the control terminal and the ground terminal;
   a voltage monitoring circuit configured to monitor a voltage between the control terminal and the ground terminal;
   a voltage comparison circuit configured to compare a voltage at the control terminal with a voltage at the input terminal; and
   a control circuit configured to perform an operation in which a discharge operation of the secondary battery is prevented by turning off a discharge control transistor included in the switch circuit in response to the voltage monitoring circuit detecting that the voltage between the control terminal and the ground terminal is greater than a first threshold, wherein, upon stopping the discharge operation, a parasitic current path is generated in which a parasitic current flows in a direction going from the power supply terminal, via the load, a parasitic diode with the lower voltage side power supply node as an anode, the control terminal, and the pull down resistor, to the ground terminal, and wherein the discharge operation of the secondary battery is allowed to be performed by turning on the discharge control transistor in response to the voltage comparison circuit detecting that the voltage at the control terminal is lower than the voltage at the input terminal.

2. The secondary-battery protecting integrated circuit according to claim 1, wherein
   in response to the voltage monitoring circuit detecting that the voltage between the control terminal and the ground terminal is less than a second threshold that is less than the first threshold, the control circuit turns on the discharge control transistor to enable the discharge operation of the secondary battery.

3. The secondary-battery protecting integrated circuit according to claim 1, wherein
   the control circuit turns off a charge control transistor included in the switch circuit to prevent a charge operation of the secondary battery in response to the voltage monitoring circuit detecting that the voltage between the control terminal and the ground terminal is greater than the first threshold, wherein the control circuit turns on the charge control transistor to enable the charge operation of the secondary battery in response to the voltage comparison circuit detecting that the voltage at the control terminal is lower than the voltage at the input terminal.

4. The secondary-battery protecting integrated circuit according to claim 2, wherein
   in response to the voltage monitoring circuit detecting that the voltage between the control terminal and the ground terminal is less than the second threshold that is less than the first threshold, the control circuit turns on the charge control transistor to enable the charge operation of the secondary battery.

5. A secondary battery protection apparatus comprising:
   the secondary-battery protecting integrated circuit according to claim 1; and
   the switch circuit.

6. A battery pack comprising:
   the secondary battery protection apparatus according to claim 5; and
   the secondary battery.

* * * * *